United States Patent
de Sandro et al.

(10) Patent No.: US 6,495,482 B1
(45) Date of Patent: *Dec. 17, 2002

(54) GLASS COMPOSITION

(75) Inventors: Jean-Philippe de Sandro, Corning, NY (US); David Jacob, Avon; Michel Prassas, Vulaines sur Seine, both of (FR)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,771

(22) Filed: May 5, 2000

(30) Foreign Application Priority Data

May 6, 1999 (FR) .............................. 99 05761

(51) Int. Cl.$^7$ .......................... C03C 3/15; C03C 3/155; C03C 3/068
(52) U.S. Cl. ............................. 501/50; 501/51; 501/78
(58) Field of Search .............................. 501/50, 51, 78

(56) References Cited

U.S. PATENT DOCUMENTS

| | | | |
|---|---|---|---|
| 5,140,456 A | 8/1992 | Huber | |
| 5,173,456 A | * 12/1992 | Hayden et al. | 501/45 |
| 5,413,971 A | 5/1995 | McPherson | 501/78 |
| 5,747,397 A | 5/1998 | McPherson et al. | 501/51 |
| 6,128,430 A | * 10/2000 | Chu et al. | 501/37 |
| 6,268,303 B1 | * 7/2001 | Aitken et al. | 501/63 |

FOREIGN PATENT DOCUMENTS

| | | |
|---|---|---|
| DE | 3 534 575 | 4/1986 |
| JP | 08 110535 A | 8/1996 |
| JP | 11-317561 | 11/1999 |

OTHER PUBLICATIONS

Influence of cations on the optical properties of Nd3=, Eu= doped borate glasses, vol. 38, No. 2, Apr. 1, 1997, pp. 59–62.

Dispersive Nonlinearity in Er–Doped Optical Fiber, Database accession No. 6411955, vol. 4, No. 3, 1999, 307–312, Qian Song et al.

Thermoluminescence Properties of Alkali Borate Glasses Containing Neodymium, Sprechsaal Vol. 121, No. 5, 1988.

* cited by examiner

*Primary Examiner*—Karl Group
(74) *Attorney, Agent, or Firm*—Mary Y. Redman

(57) ABSTRACT

A glass composition well suited for use in optical amplification consists of an erbium-doped borate glass composition comprising at least 30 mole percent of $B_2O_3$, not over 30 mole percent of $SiO_2$, preferably not over 5 mole percent of $La_2O_3$, a ratio of $B_2O_3$ to ($\Sigma X_2O+\Sigma YO$) that is at least 3.5, preferably 4.5, where $X_2O$ represents monovalent metal oxides(s) and YO represents divalent metal oxides, the glass providing a wide useful bandwidth (50 nm and greater) for optical amplification around the 1545 nm region.

8 Claims, 5 Drawing Sheets

GLASS COMPOSITION

FIELD OF THE INVENTION

The present invention relates to a new family of glasses, which is well suited to use in WDM telecommunication systems employing optical amplification at wavelengths particularly in the third telecom window, i.e. near 1.5 μm. More particularly, the present invention relates to a family of erbium-doped borate glasses.

BACKGROUND OF THE INVENTION

In optical fibre communications systems there is an increasing need for amplifier materials which provide a flat gain characteristic over wider and wider bandwidths, especially in the third (1525–1560 nm) and fourth (1565–1615) telecom windows. At present, unmodified erbium-doped fibre amplifiers (EDFA) are often used for optical amplification, the base material consisting of a silica glass composition. However, the gain characteristic of EDFA in the 1530 to 1560 nm range is not flat, leading to a need to use equalisation and/or filtering techniques.

In wavelength division multiplexing (WDM) systems, the requirement for gain flatness over a large bandwidth increases as the number of communications channels to be transported increases. For example, in systems designed for carrying 32 communications channels a current proposal is to use erbium-doped ZBLAN glass ($ZrF_4$—$BaF_2$—$LaF_3$—$AlF_3$—NaF), which has a gain ripple of less than 7% over a region approaching 30 nm in width. Although this performance is good, similar performance can be obtained using conventional silica-based fibres in association with known filtering and/or equalisation techniques (although an increase in pump power is required, which increases costs), or using other hybrid silica-fibre design.

The present invention seeks to provide a glass composition having a particularly flat gain characteristic in the 1.5 μm wavelength region.

The present invention seeks further to provide a glass composition having a flat gain characteristic, in the 1.5 μm wavelength region, over a bandwidth wider than that typically obtainable using silica-based fibres and with filtering techniques, or silica/hybrid active fibres.

Now, the emission spectrum of the erbium ions present in erbium-doped ZBLAN glass compositions is around 20 nm wider than that in silica-based glass compositions. The present inventors have found that erbium emission over an even wider bandwidth occurs in erbium-doped borate glasses, and that these glasses are well suited for applications in optical amplification.

SUMMARY OF THE INVENTION

More particularly, the present invention provides a glass composition comprising an erbium-doped borate, wherein at least 30 mole percent of the glass composition is made up of $B_2O_3$.

Advantageously, the glass compositions according to the invention comprise 0.01 to 10, or yet more advantageously 0.01 to 2.5, parts by weight of $Er_2O_3$ and 0 to 6 parts by weight of $Yb_2O_3$ for 100 parts by weight made up, as follows:

| | | | | | |
|---|---|---|---|---|---|
| $SiO_2$ | 0–30 mol. % | $B_2O_3$ | 30–90 mol. % | $Al_2O_3$ | 0–15 mol. % |
| $GeO_2$ | 0–50 mol. % | $Sb_2O_3$ | 0–60 mol. % | $TeO_2$ | 0–50 mol. % |
| $\Sigma(X_2O)$ | 0–20 mol. % | $\Sigma(YO)$ | 0–20 mol. % | $BaO$ | 0–15 mol. % |
| $La_2O_3$ | 0–5 mol. % | $Y_2O_3$ | 0–5 mol. % | $Ga_2O_3$ | 0–5 mol. % |
| $Ta_2O_5$ | 0–5 mol. % | $TiO_2$ | 0–5 mol. % | | |

In a first preferred embodiment of the invention, the glass composition includes equal to or less than 30 mole percent of $SiO_2$.

It has been found that glass compositions according to the first preferred embodiment of the invention have a flat gain characteristic over a bandwidth of almost 50 nm. This approaches the performance required for a practical WDM system transporting 64 channels.

The quantum efficiency of the glass compositions according to the first preferred embodiment of the invention can be improved by preparing the composition in a process including the step of full dehydration (in which the glass is melted under dry conditions), or in a glass purification process consisting in the use of ultrapure raw materials.

In a second preferred embodiment of the invention, the glass composition includes less than or equal to 5 mol. % of $La_2O_3$ and the ratio of $B_2O_3$ to $(\Sigma X_2O+\Sigma YO)$ is equal to or greater than 3.5 or, more advantageously, equal to or greater than 4.5, where $X_2O$ represents any monovalent metal oxides present and YO represents any divalent metal oxides present.

It has been found that glass compositions according to the second preferred embodiment of the invention have a flat gain characteristic over a particularly wide bandwidth, typically around 80 nm.

In the glass compositions according to the second preferred embodiment of the invention, it has been found advantageous for $X_2O$ to comprise $Li_2O$, and YO to comprise PbO.

The fluorescence lifetime of glass compositions according to the second preferred embodiment of the invention is improved when the preparation of the glass composition includes the step of dehydration. The improvement of lifetime is particularly noticeable in the case of compositions including heavier cations, such as Pb, Te, Sb, and Bi.

Structural and other properties of the glass compositions can be tailored by selective addition of up to 5 mol. % of a component such as $ZrO_2$, $TiO_2$, $Y_2O_3$, $Ta_2O_5$, $Gd_2O_3$ or $La_2O_3$. It is to be noted that this list of components is not exhaustive.

The glass compositions according to the present invention can be used in association with known filtering techniques in order to obtain an even wider useful bandwidth. In the case of glass compositions according to the second preferred embodiment of the invention, the useful bandwidth can be extended by this means to almost 100 nm, which is a great improvement over the bandwidth of around 32 nm obtainable for silica-based EDFAs.

Other features and advantages of the present invention will become clear from the following description of preferred embodiments thereof, given by way of example. The invention is illustrated by the accompanying drawings, in which:

BRIEF DESCRIPTION OF THE INVENTION

Figure 1:
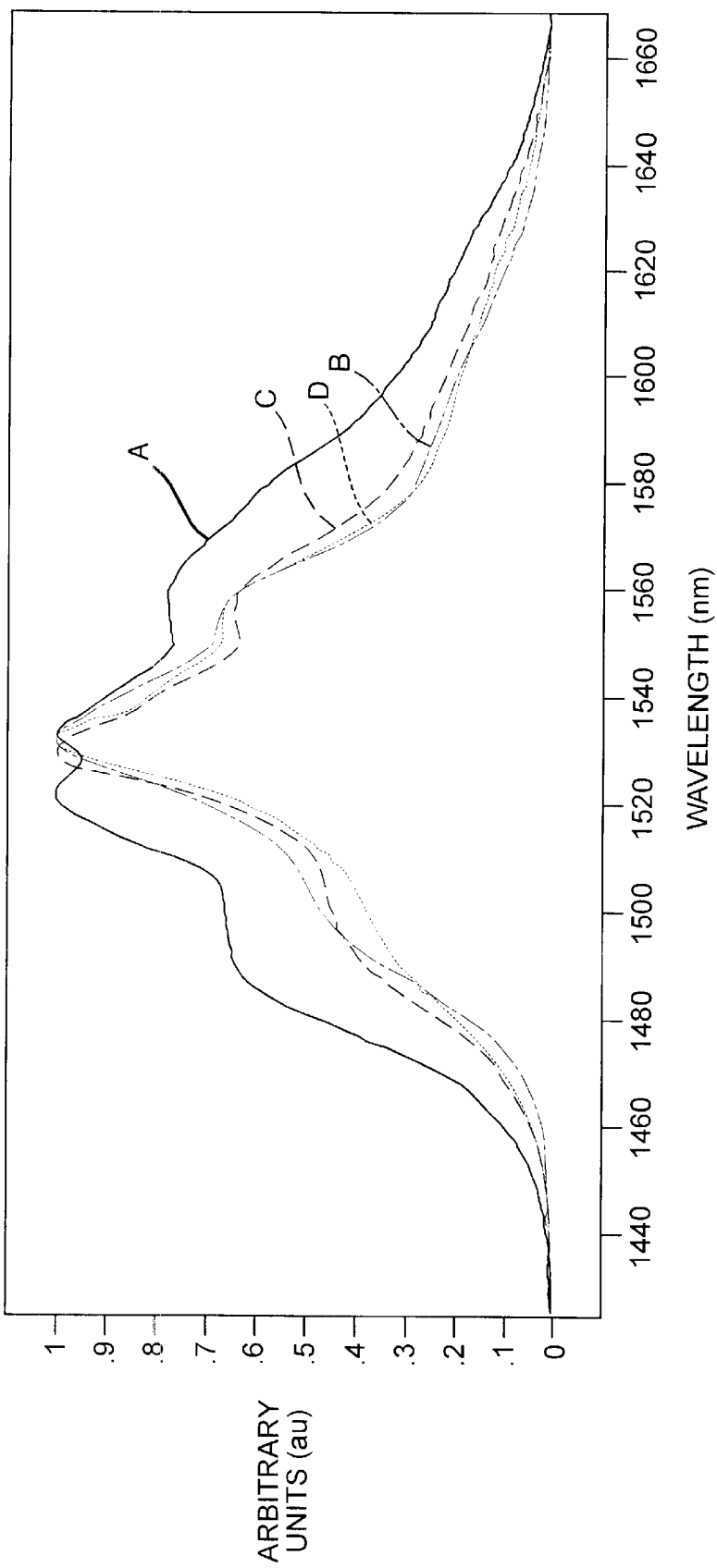
FIG. 1 is a graph comparing the gain characteristic of borate glasses with those of ZBLAN glass, fluoroaluminosilicates, and antimony silicates, in the 1.5 μm wavelength region.

It has been found that erbium-doped borate glasses are particularly well suited to applications in optical amplification at wavelengths near 1.5 μm. FIG. 1 is a graphical representation illustrating the erbium emission spectrum in borate glasses and compares it with the emission spectrum in ZBLAN glass as well as that in fluoroaluminosilicates and antimony silicates. In FIG. 1, wavelength, in nanometers (nm), is plotted on the horizontal axis. Fluorescent emission of erbium is plotted in arbitrary units (a.u.), chosen for comparison purposes, on the vertical axis.

In FIG. 1, the letter A denotes the erbium emission spectrum for a borate glass having the composition of Example 5 in TABLE I, infra. The letter B designates the erbium emission spectrum in ZBLAN glass. The letters C and D denote the emission spectra for typical antimony silicate and fluoroaluminosilicate glasses, respectively. It will be seen from FIG. 1 that, near the 1.5 μm wavelength region, the erbium emission bandwidth in borates is wider than that in ZBLAN or in the different silicate glass compositions. More particularly, the full width half maximum (FWHM) of the normalised emission of erbium in the borate glasses is 100 nm compared with 60 nm for the best boron-free glass.

Figure 2:
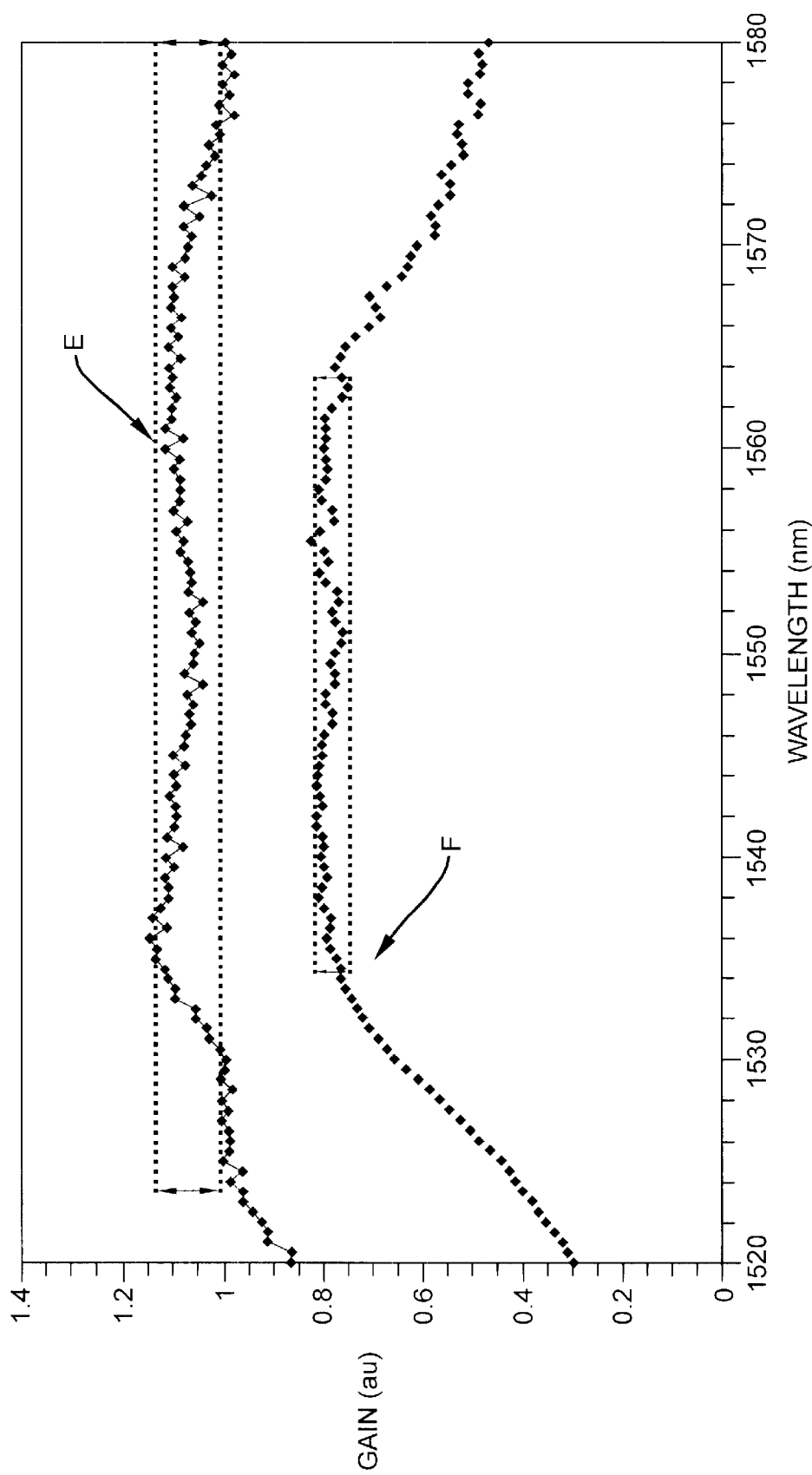
FIG. 2 is a graph comparing the gain ripple of borate glasses according to the invention with that exhibited by a ZBLAN glass composition.

FIG. 2 is a graphical representation comparing the gain characteristics for an erbium-doped borate glass composition with that exhibited by an erbium-doped ZBLAN glass composition in FIG. 2, wavelength, in nanometers (nm), is plotted on the horizontal axis. Gain, in arbitrary units (a.u.), is plotted on the vertical axis.

The curves in FIG. 2 are based on gain characteristics simulated by calculation based on emission and absorption cross-sections. Curve E represents the gain characteristic for a typical, erbium-doped borate glass in accordance with the first embodiment of the invention. Curve F is a corresponding representation of the ZBLAN glass. Gain ripple is indicated by vertical arrows between horizontal dotted lines. The dotted lines represent the wavelength range in which the gain is sufficiently flat to be useful, that it has no more than 13% gain ripple.

It is clear from FIG. 2 that the borate glasses exhibit a relatively flat gain characteristic over 64 nm, whereas the ZBLAN glass composition exhibits a relatively flat gain characteristic over around 30 nm only. More especially, the gain ripple for the borate glass over this 64nm bandwidth is as low as 13%, without filtering.

The advantageous performance of erbium-doped borate glass compositions according to the present invention is seen when, out of 100 parts by weight, at least 30 mole percent consists of $B_2O_3$ and, in addition to these 100 parts by weight, the composition includes between 0.01 and 10 parts by weight of $Er_2O_3$, more preferably between 0.01 and 2.5 parts by weight of $Er_2O_3$.

The borate glass compositions according to the invention may also be co-doped with $Yb_2O_3$: the composition including, in addition to the previously-mentioned 100 parts by weight of other constituents, between 0 and 15 parts by weight of $Yb_2O_3$, and, more preferably, between 0 and 6 parts by weight of $Yb_2O_3$. $Yb_2O_3$ does not directly contribute to the emission spectrum. Rather, it contributes indirectly, that is, by transferring energy to the erbium ions, thus enhancing their activity.

According to a first preferred embodiment of the present invention the erbium-doped borate glass has a low silica content, less than 30 mol. percent.

Some typical compositions and properties of glasses according to the first preferred embodiment of the invention are given in Table 1 below, where they are compared with two known glass compositions. The third Comparative Example is a glass according to the first preferred embodiment of the invention but which contains more PbO than the most preferred compositions. Ex. 3, in TABLE I, is, in effect, a comparison example. It shows the effect of excess $Na_2O$ in a borate glass, otherwise, within the present invention.

TABLE 1

|  | Ex. 1 | Ex. 2 | Ex. 3 | Ex. 4 | Ex. 5 | Comp. Ex. 1, ZBLAN | Comp. Ex. 2*, fluorophosphate | Comp. Ex. 3 |
|---|---|---|---|---|---|---|---|---|
| $B_2O_3$ (wt. %) | 85 | 80 | 70 | 80 | 90 |  |  | 38 |
| $Li_2O$ (wt. %) |  |  |  |  | 2 |  |  |  |
| $Na_2O$ (wt. %) | 15 | 20 | 30 |  | 5 |  | 0.5 |  |
| $K_2O$ (wt. %) |  |  |  |  |  |  |  | 0.9 |
| BaO (wt. %) |  |  |  | 20 | 3 |  | 2.7 |  |
| PbO (wt. %) |  |  |  |  |  |  |  | 45 |
| $Al_2O_3$ (wt. %) |  |  |  |  |  |  | 3.2 | 0.8 |
| $As_2O_3$ (wt. %) |  |  |  |  |  |  |  | 0.5 |
| $SiO_2$ (wt. %) |  |  |  |  |  |  |  | 14.8 |
| $Er_2O_3$ (wt. %) | 5 | 5 | 5 | 5 | 5 | 0.8 | 6 | 3 |

TABLE 1-continued

|  | Ex. 1 | Ex. 2 | Ex. 3 | Ex. 4 | Ex. 5 | Comp. Ex. 1, ZBLAN | Comp. Ex. 2*, fluorophosphate | Comp. Ex. 3 |
|---|---|---|---|---|---|---|---|---|
| Flatness, δG (1530–1560 nm) | 5 | 3 | | 3 | | 14 | 16 | |
| Flatness, δG (1524–1570 nm) | 8 | | | 10 | | | | |
| Flatness, δG (1530–1580 nm) | | | | | 16 | | | |
| Quantum efficiency | 4.1 | | | 5.4 | | | 68 | 17.1 |
| FWHM(nm) (ems signal) | 85 | 80 | 54 | 78 | 103 | 69 | 51 | 52 |

*The fluorophosphate glass composition constituting Comparative Example 2 in Table 1 also includes 16.9 wt. % $P_2O_5$, 5.8 wt. % $MgF_2$, 18.7 wt. % $CaF_2$, 19.7 wt. % $SrF_2$, 113 wt. % $BaF_2$, 19.3 wt. % $AlF_3$, 1.3 wt. % $KHF_2$ and 0.6 wt. % $K_2TiF_6$.

The flatness, δG, is here defined as the difference between the highest and lowest gain in the wavelength range under consideration, scaled by dividing by the lowest gain in the wavelength range. This quantity is generally known as the F.O.M. (figure of merit).

The gain characteristics of glass compositions can be calculated from the equation below:

$$G \text{ (dB/cm)} \approx 2.17 * N_t * \{\sigma_{em}(\lambda)*(1+D) - \sigma_{ab}(\lambda)*(1-D)\}$$

where $\sigma_{em}(\lambda)$ = emission cross-section in $cm^2$ $\sigma_{ab}(\lambda)$ = absorption cross-section in $cm^2$ $N_2$ = upper level ($^4I_{13/2}$) ion population (averaged over the length)

$N_1$ = ground state ($^4I_{15/2}$) ion population (averaged over the length)

$N_t$ = total Er ion concentration in $cm^{-3}$ $D = (N_2 - N_1)/N_t$

D = −1, at 0% inversion

D = +1, at 100% inversion

Figure 3:
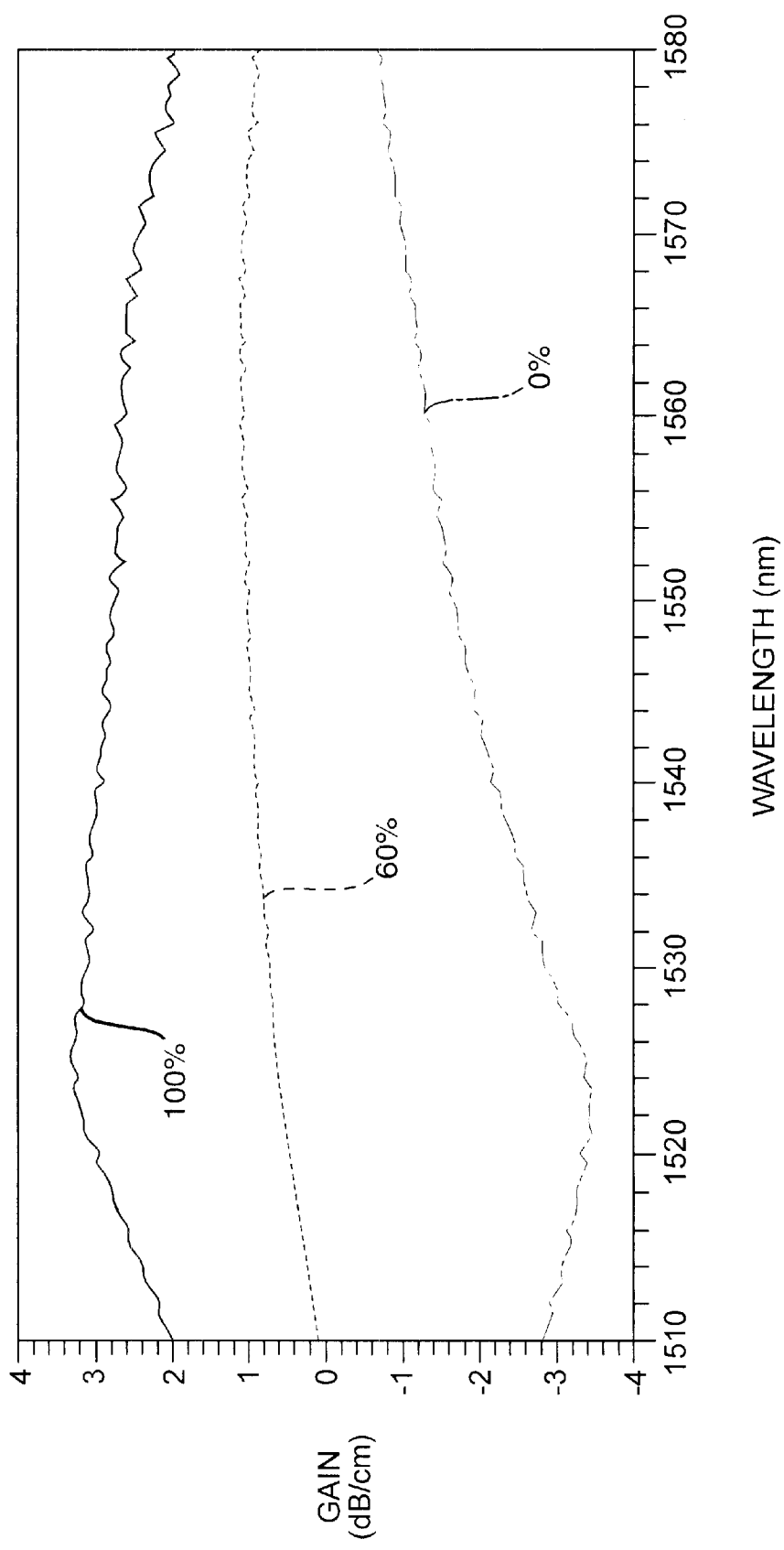
FIG. 3 is a graph showing the calculated gain characteristic for a glass composition according to the first preferred embodiment of the invention.

Calculated gain characteristics for a glass having the composition shown in Example 1 of TABLE I are plotted in FIG. 3. For comparison, corresponding, calculated gain characteristics for ZBLAN and for a fluorophosphate glass are plotted in FIGS. 4 and 5, respectively. The ZBLAN glass composition is that shown as comparative Example 1 in TABLE I; the fluorophosphate is that shown as comparative Example 2. It will be appreciated that glasses having compositions within the limits of the present invention will have gain characteristics similar to those shown for that of Ex. 1 in FIG. 3.

Figure 4:
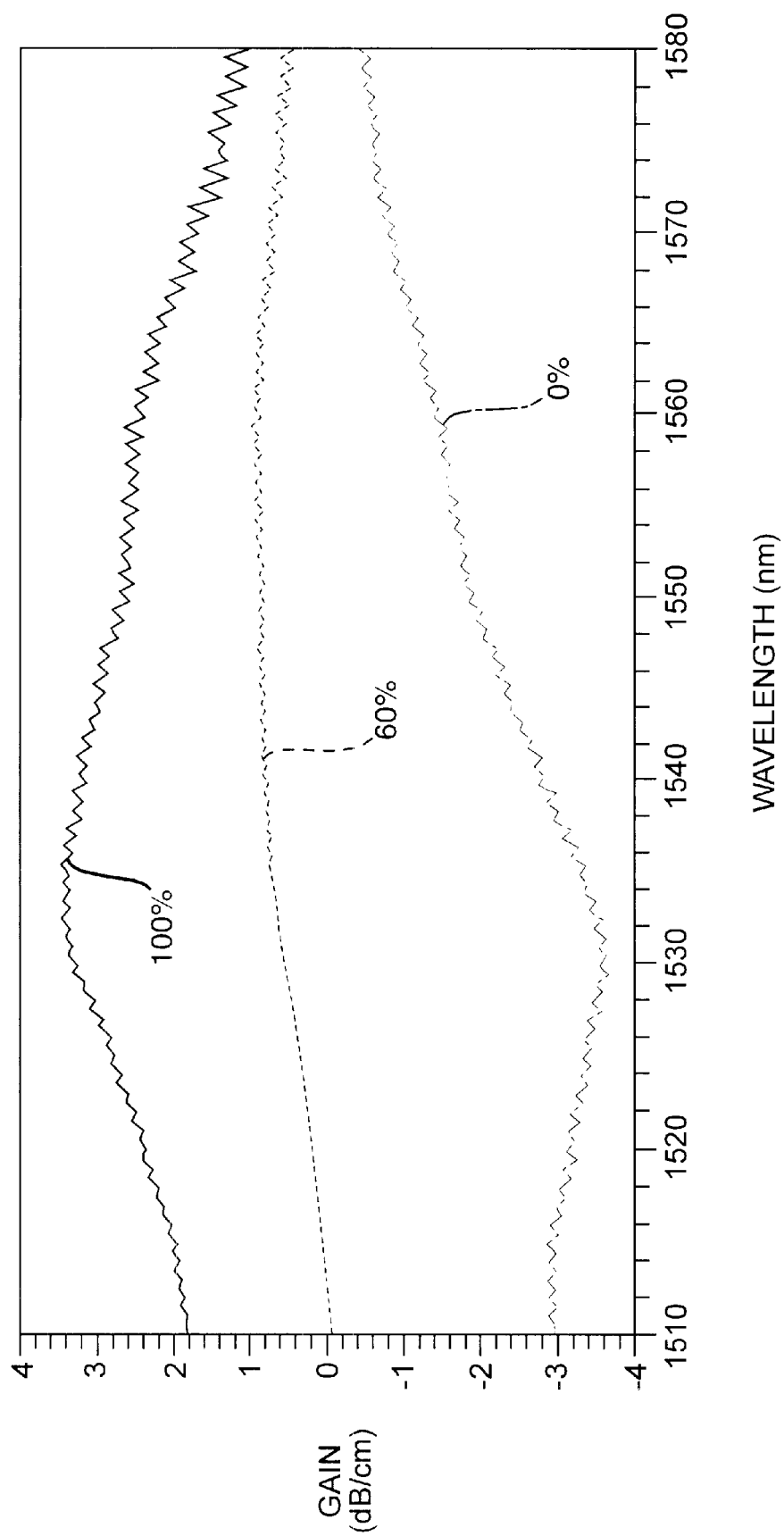
FIG. 4 is a graph showing the calculated gain characteristic for a ZBLAN glass composition, for comparison purposes.
Figure 5:
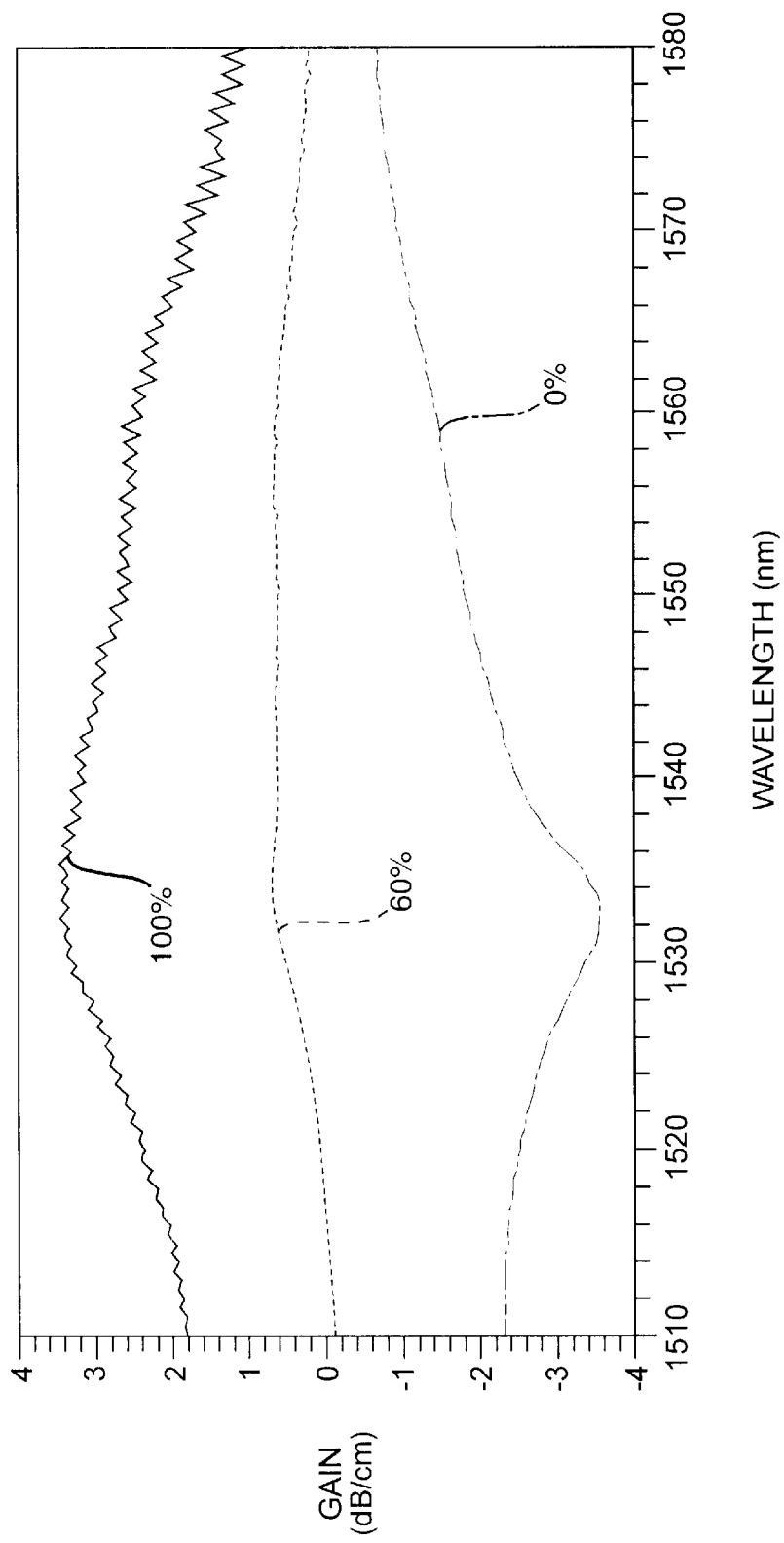
FIG. 5 is a graph showing the calculated gain characteristic for a fluorophosphate glass composition, for comparison purposes.

In FIGS. 3, 4 and 5, wavelength, in nm, is plotted on the horizontal axis. Gain, in decibels/centimeter (dB/cm) is plotted on the vertical axis. In each of FIGS. 3, 4 and 5, the gain characteristic curves, for 100%, 60% and 0% ion-inversion respectively, are shown for each glass.

Maximum gain is obtained at 100% inversion, that is, with 100% of the erbium ions raised to the fluorescing level. However, as indicated, there is no significant flatness at this level. While filtering arrangements can be introduced to achieve flatness, this is ordinarily too expensive to be practical. Accordingly, it is customary to choose a level of about 60–70% inversion to operate at.

The glass compositions according to the first preferred embodiment of the invention have low quantum efficiency. This is due in part to their high OH content and in part to the increased non-radiative relaxation that takes place therein (it is well-known that borates have high phonon energy which favours the non-radiative relaxation from the $^4I_{13/2}$ level).

Amplification can still take place despite this low quantum efficiency. However, if desired, action can be taken to improve quantum efficiency. The non-radiative rate cannot be changed. However, quenching by OH can be reduced by full dehydration of the glasses (e.g. by melting the glasses in dry conditions). Furthermore, quenching by impurities can be reduced by preparing the glasses using ultrapure raw materials. These measures enable the quantum efficiency of these glass compositions to be improved (up to a QE of 50%, operating at low erbium concentrations).

A second preferred embodiment of the invention provides erbium-doped, high boron-oxide bearing glasses having a high $B_2O_3$ content compared with their content in terms of monovalent metal oxides or divalent metal oxides. More particularly, it is advantageous that the ratio of $B_2O_3$ to $(\Sigma X_2O + \Sigma YO)$ should be equal to or greater than 3.5 or, still more advantageously, equal to or greater than to 4.5, where $X_2O$ represents any monovalent metal oxides present (for example, Li, Na, K, Cs,.) and YO represents any divalent metal oxides present (for example, Mg, Ca, Ba, Pb, Zn, . . . ). Preferably, these glasses contain at most 5 mol. % of $La_2O_3$.

It has been found that in the glass compositions according to the second preferred embodiment of the invention it is preferable that the monovalent metal oxide consists of or includes $Li_2O$, while for the oxides of divalent metals PbO is preferred. In some systems (such as B/Pb, B/Te, for example), glasses free of alkalis and alkali earths can be made.

The durability of the glass can be improved, and other properties controlled, by selective addition of glass-forming elements. Typical glass-forming elements are $SiO_2$, $GeO_2$, $Al_2O_3$, $Sb_2O_3$, and $TeO_2$. Addition of such components has little or no effect on the bandwidth, provided that the other criteria concerning the composition of the glass are respected.

Structural properties, such as the refractive index and viscosity, of the glass composition can be controlled, and/or the dispersion of erbium ions inside the glass matrix can be improved, by selective addition of up to 5 mol. % of components such as $ZrO_2$, $TiO_2$, $Y_2O_3$, $Ta_2O_5$, $Gd_2O_3$, $La_2O_3$. Again, it i be noted that this list can be extended.

Some typical compositions and properties of glasses according to the second preferred embodiment of the invention and some comparative examples (CE) are given in Table 2 below. Certain of the comparative examples (indicated by an asterisk) are glasses according to the second preferred embodiment of the invention but which contain more $La_2O_3$ or BaO than the most preferred compositions.

TABLE 2

|  | 1 | 2 | 3 | 4 | 5 | 6 | 7 | 8 | 9 | 10 | 11 | 12 | 13 | CE1 | CE2 | 14 | CE3* |
|---|---|---|---|---|---|---|---|---|---|---|---|---|---|---|---|---|---|
| $B_2O_3$ | 85.5 | 85 | 72 | 63 | 54 | 36 | 90 | 90 | 90 | 90 | 85.5 | 76.5 | 70.5 | 65 | 65 | 85.5 | 81 |
| $Li_2O$ | 1.9 | 2 | 1.6 | 1.4 | 1.2 | 0.8 | 2 | 2 | 2 | 2 | 1.9 | 1.7 | 1.8 | | 5 | 1.9 | 1.8 |
| $Na_2O$ | 4.75 | 5 | 4 | 3.5 | 3 | 2 | 5 | 5 | 5 | 5 | 4.75 | 4.25 | 4.5 | 5 | | 4.75 | 4.5 |
| CaO | | | | | | | | 3 | | 1 | | | | | | | |
| BaO | 2.85 | 3 | 2.4 | 2.1 | 1.8 | 1.2 | 3 | | | | 2.85 | 2.55 | 2.7 | | 30 | 2.85 | 2.7 |
| SrO | | | | | | | | | 1 | | | | | | | | |
| PbO | | | | | | | | | 1 | 3 | | | | | 30 | | |
| $Al_2O_3$ | 5 | 5 | 5 | 5 | 5 | 5 | | | | | | | 5 | | | | |
| $La_2O_3$ | | | | | | | | | | | | | | | | 5 | 10 |
| $Sb_2O_3$ | | | | | | | | | | | | | | | | | |
| $As_2O_3$ | | | | | | | | | | | | | | | | | |
| $SiO_2$ | | | 5 | 5 | 5 | 5 | | | | | 5 | 15 | 15 | | | | |
| $GeO_2$ | | | 10 | 20 | 30 | 50 | | | | | | | | | | | |
| $BaF_2$ | | | | | | | | | | | | | | | | | |
| $Na_2F_2$ | | | | | | | | | | | | | | | | | |
| $Al_2F_6$ | | | | | | | | | | | | | | | | | |
| $Er_2O_3$ wt. % | 5 | 5 | 1 | 1 | 1 | 1 | 5 | 1 | 1 | 1 | 1 | 1 | 1 | 1 | 1 | 1 | 1 |
| R | 9 | 8.5 | 9 | 9 | 9 | 9 | 9 | 9 | 9 | 9 | 9 | 9 | 7.8 | 1.86 | 1.86 | 8.9 | 8.9 |
| FWHM | 90 | 90 | 87 | 85 | 81 | 75 | 102 | 102 | 102 | 102 | 103 | 103 | 88 | 71 | 52.7 | 77.7 | 64.7 |

|  | CE4* | 15 | 16 | CE5 | CE6 | CE7 | CE8 | 17 | CE9* | 18 | 19 | 20 | 21 | CE10 | CE11* | 22 |
|---|---|---|---|---|---|---|---|---|---|---|---|---|---|---|---|---|
| $B_2O_3$ | 76.5 | 80 | 81 | 70 | 69.7 | 75 | 70 | 80 | 80 | 80 | 66 | 94.9 | 92.55 | 70 | 73.5 | 85 |
| $Li_2O$ | 1.7 | 2 | 1.8 | | 4.3 | 4 | 10 | | | | 1.8 | 5.1 | 7.45 | 10 | | |
| $Na_2O$ | 4.25 | 5 | 4.5 | 30 | 13 | 8.3 | 20 | 20 | | | 4.5 | | | | | 15 |
| $K_2O$ | | | | | 13 | 12.7 | | | | | | | | | | |
| CaO | | | | | | | | | | | | | | 20 | | |
| BaO | 2.55 | 3 | 2.7 | | | | | | 20 | | 2.7 | | | | 3.7 | |
| SrO | | | | | | | | | | | | | | | 9.9 | |
| PbO | | | | | | | | | | 20 | | | | | | |
| $Al_2O_3$ | | 10 | 10 | | | | | | | | 10 | | | | | |
| $La_2O_3$ | 15 | | | | | | | | | | | | | | 12.9 | |
| $As_2O_3$ | | | | | | | | | | | | | | | | |
| $SiO_2$ | | | | | | | | | | | 15 | | | | | |
| $GeO_2$ | | | | | | | | | | | | | | | | |
| $BaF_2$ | | | | | | | | | | | | | | | | |
| $Na_2F_2$ | | | | | | | | | | | | | | | | |
| $Al_2F_6$ | | | | | | | | | | | | | | | | |
| $Er_2O_3$ wt. % | 1 | 1 | 1 | 1 | 1 | 1 | 1 | 1 | 1 | 1 | 1 | 1 | 1 | 1 | 1 | 1 |
| R | 8.8 | 8 | 9 | 2.3 | 2.3 | 3 | 2.3 | 4 | 4 | 4 | 7.3 | 18.6 | 12.4 | 2.3 | 5.4 | 5.7 |
| FWHM | 58.9 | 86.4 | 86.4 | 53 | 53 | 64 | 71.1 | 78 | 60.3 | 86 | 84.1 | 108 | 101 | 63 | 56.8 | 92.3 |

|  | 23 | 24 | 25 | 26 | 27 | 28 | CE12 | CE13 | 29 | 30 | 31 | CE14 | CE15 | 32 | 33 | CE16 |
|---|---|---|---|---|---|---|---|---|---|---|---|---|---|---|---|---|
| $B_2O_3$ | 79 | 77 | 75 | 45 | 40 | 35 | 25 | 15 | 90 | 60 | 45 | 30 | | 40 | 35 | 25 |
| $Li_2O$ | 5 | 5 | 5 | 2 | 2 | 2 | 2 | 2 | 2 | 2 | 2 | 2 | 2 | 2 | 2 | 2 |
| $Na_2O$ | 15 | 15 | 15 | 5 | 5 | 5 | 5 | 5 | 5 | 5 | 5 | 5 | 5 | 5 | 5 | 5 |
| $K_2O$ | | | | | | | | | | | | | | | | |
| CaO | | | | | | | | | | | | | | | | |
| BaO | | | | 3 | 3 | 3 | 3 | 3 | 3 | 3 | 3 | 3 | 3 | 3 | 3 | 3 |
| SrO | | | | | | | | | | | | | | | | |
| $Al_2O_3$ | 1 | 3 | 5 | | | | | | | | | | | | | |
| $La_2O_3$ | | | | | | | | | | | | | | | | |
| $Sb_2O_3$ | | | | 45 | 45 | 45 | 45 | 45 | | 30 | 45 | 60 | 90 | 45 | 45 | 45 |
| $SiO_2$ | | | | | | | | | | | | | | 5 | 10 | 20 |
| $GeO_2$ | | | | | 5 | 10 | 20 | 30 | | | | | | | | |
| $BaF_2$ | | | | | | | | | | | | | | | | |
| $Na_2F_2$ | | | | | | | | | | | | | | | | |
| $Al_2F_6$ | | | | | | | | | | | | | | | | |
| $Er_2O_3$ wt. % | 1 | 1 | 1 | 1 | 1 | 1 | 1 | 1 | 4.5 | 1 | 1 | 1 | 1 | 1 | 1 | 1 |
| R | 3.95 | 2.85 | 3.75 | 4.5 | 4 | 3.5 | 2.5 | 1.5 | 9 | 6 | 4.5 | 3 | 0 | 4 | 3.5 | 2.5 |
| FWHM | 88.2 | 81.2 | 88.2 | 81 | 79 | 77 | 65 | 64 | 103 | 91 | 81 | 78 | 56 | 80 | 78 | 73 |

|  | 34 | 35 | 36 | 37 | 38 | 39 | CE17 | CE18 | 40 | 41 | 42 | 43 | 44 | 45 | CE19 | CE20 |
|---|---|---|---|---|---|---|---|---|---|---|---|---|---|---|---|---|
| $B_2O_3$ | 85.5 | 84.5 | 82.5 | 80.5 | 45 | 47.5 | 25 | 25 | 85.5 | 85.5 | 85.5 | 75.5 | 75.5 | 75.5 | 65.5 | 65.5 |
| $Li_2O$ | 1.9 | 1.9 | 1.9 | 1.9 | 2 | 1 | 1 | | 1.9 | 1.9 | 1.9 | 1.9 | 1.9 | 1.9 | 1.9 | 1.9 |
| $Na_2O$ | | | | | 5 | 2.5 | 2.5 | | 4.75 | 7.6 | 9.5 | 4.75 | 4.75 | 4.75 | 4.75 | 4.75 |
| CaO | | | | | | | | | | | | | | 10 | | 20 |
| BaO | | | | | 3 | 1.5 | | | 2.85 | | | 2.85 | 2.85 | 2.85 | 2.85 | 2.85 |
| SrO | | | | | | | 1.5 | | | | | | 10 | | | |
| PbO | | | | | | | | 10 | | | | | | | | |

TABLE 2-continued

| | | | | | | | | | | | | | | | | |
|---|---|---|---|---|---|---|---|---|---|---|---|---|---|---|---|---|
| MgO | | | | | | | 5 | | | | | | | 10 | | 20 |
| Al$_2$O$_3$ | | | | | | | | | 5 | 5 | 5 | 5 | 5 | 5 | 5 | 5 |
| Sb$_2$O$_3$ | | | | | | | 45 | 45 | | | | | | | | |
| GeO$_2$ | | | | | 45 | 47.5 | 20 | 20 | | | | | | | | |
| BaF$_2$ | 2.85 | 2.85 | 2.85 | 2.85 | | | | | | | | | | | | |
| Na$_2$F$_2$ | 4.75 | 4.75 | 4.75 | 4.75 | | | | | | | | | | | | |
| Al$_2$F$_6$ | 5 | 6 | 8 | 10 | | | | | | | | | | | | |
| Er$_2$O$_3$ | 1 | 1 | 1 | 1 | 1 | 1 | 1 | 1 | 1.2 | 1 | 1 | 1 | 1 | 1 | 1 | 1 |
| wt. % | | | | | | | | | | | | | | | | |
| R | 45 | 44.5 | 43.4 | 42.4 | 4.5 | 9.5 | 2.5 | 2.5 | 9 | 9 | 9 | 3.9 | 3.9 | 3.9 | 2.2 | 2.2 |
| FWHM | 89 | 87 | 84 | 82 | 82 | 90 | 75 | 76 | 82 | 80 | 87 | 85 | 80 | 79 | 58 | 68 |

In Table 2, R represents the ratio of B$_2$O$_3$ to ($\Sigma$X$_2$O+$\Sigma$YO).

It will be seen from Table 2 that the preferred glass compositions according to the second preferred embodiment of the invention have FWHM values of 75 or greater, indicating their particularly large useful bandwidth in the wavelength range of interest.

Typical fluorescence lifetimes in the compositions according to the second preferred embodiment of the invention are low, typically under 1 ms. This is because of the high water content of these glasses. Lifetime can be improved using common techniques serving to dehydrate the glasses, such as, using halogen compounds for the starting materials, melting the glasses under vacuum, using pre-calcinated precursor materials, etc. Those glass compositions, according to the second preferred embodiment of the invention, which contain heavier cations, such as Pb/Te/Sb/Bi, are more sensitive to dehydration and exhibit lifetimes superior to 1.5 ms.

In order to dehydrate the glasses, the use of halogenated starting materials (fluorides, bromides, chlorides . . . ) is recommended, as is the melting of the glasses in a controlled atmosphere or in partial vacuum. The use of gas (for example boron chloride, BCl$_3$), bubbling in the molten glass mix, can also be envisaged.

It is particularly preferred that the glass compositions according to the invention should be defined by the following expression: for 100 parts by weight made up as follows:

| | | | | | |
|---|---|---|---|---|---|
| SiO$_2$ | 0–30 mol. % | B$_2$O$_3$ | 30–90 mol. % | Al$_2$O$_3$ | 0–15 mol. % |
| GeO$_2$ | 0–50 mol. % | Sb$_2$O$_3$ | 0–60 mol. % | TeO$_2$ | 0–50 mol. % |
| $\Sigma$(X$_2$O) | 0–20 mol. % | $\Sigma$(YO) | 0–20 mol. % | BaO | 0–15 mol. % |
| La$_2$O$_3$ | 0–5 mol. % | Y$_2$O$_3$ | 0–5 mol. % | Ga$_2$O$_3$ | 0–5 mol. % |
| Ta$_2$O$_5$ | 0–5 mol. % | TiO$_2$ | 0–5 mol. % | | |

(with B$_2$O$_3$/($\Sigma$X$_2$O+$\Sigma$YO)$\geq$3.5 or, more advantageously, $\geq$4.5, where X$_2$O represents any monovalent metal oxides present and YO represents any divalent metal oxides present), there are 0.01 to 10, or yet more advantageously 0.01 to 2.5, parts by weight of Er$_2$O$_3$ and 0 to 6 parts by weight of Yb$_2$O$_3$.

Although the present invention has been described with reference to certain specific embodiments thereof, the invention is not limited to the detailed features of these embodiments. On the contrary, numerous modifications and adaptations of the described embodiments can be made within the scope of the appended claims.

What is claimed is:

1. A borate glass having at least 30 mole % of B$_2$O$_3$, 0–30 mole % SiO$_2$, at least one monovalent, or divalent, metal oxide, the ratio of B$_2$O$_3$ to the total content of monovalent and divalent metal oxides being at least 3.5:1, the glass being doped with 0.1–10% Er$_2$O$_3$ and 0–6% Yb$_2$O$_3$.

2. A glass composition in accordance with claim 1 wherein the ratio of B$_2$O$_3$ to the total content of all monovalent and/or divalent metal oxides present is at least 4.5:1.

3. A glass composition in accordance with claim 1 wherein the composition is further limited as follows:

| | | | | | |
|---|---|---|---|---|---|
| SiO$_2$ | 0–30 mol. % | B$_2$O$_3$ | 30–90 mol. % | Al$_2$O$_3$ | 0–15 mol. % |
| GeO$_2$ | 0–50 mol. % | Sb$_2$O$_3$ | 0–60 mol. % | TeO$_2$ | 0–50 mol. % |
| $\Sigma$(X$_2$O) | 0–20 mol. % | $\Sigma$(YO) | 0–20 mol. % | BaO | 0–15 mol. % |
| La$_2$O$_3$ | 0–5 mol. % | Y$_2$O$_3$ | 0–5 mol. % | Ga$_2$O$_3$ | 0–5 mol. % |
| Ta$_2$O$_5$ | 0–5 mol. % | TiO$_2$ | 0–5 mol. % | | | wherein X$_2$O is a monovalent oxide and YO is a divalent oxide.

4. A glass composition in accordance with claim 3 wherein X$_2$O comprises Li$_2$O.

5. A glass composition in accordance with claim 3 wherein YO comprises PbO.

6. A glass composition in accordance with claim 3 that comprises at least 1 heavy metal cation selected from the group consisting of Pb, Te, Sb and Bi.

7. A glass composition in accordance with claim 3 comprising, in an amount up to about 5 mole %, one or more oxides selected from the group consisting of ZrO$_2$, TiO$_2$, Y$_2$O$_3$, Ta$_2$O$_5$, Gd$_2$O$_3$ and La$_2$O$_3$ to improve dispersion of erbium and structural properties in the glass.

8. A glass composition in accordance with claim 3 comprising at least one glass forming oxide selected from the group consisting of SiO$_2$, Al$_2$O$_3$, Sb$_2$O$_3$ and TeO$_2$ to improve glass durability.

* * * * *